United States Patent
Lee et al.

(10) Patent No.: US 6,918,263 B2
(45) Date of Patent: *Jul. 19, 2005

(54) AIR CONDITIONING SYSTEM

(75) Inventors: Won Hee Lee, Seoul (KR); Yoon Jei Hwang, Seoul (KR); Chan Ho Song, Gwacheon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/668,155

(22) Filed: Sep. 24, 2003

(65) Prior Publication Data

US 2004/0123616 A1 Jul. 1, 2004

(30) Foreign Application Priority Data

Dec. 26, 2002 (KR) .................. 10-2002-0083915

(51) Int. Cl.⁷ .................. F25D 23/00; F25D 17/06
(52) U.S. Cl. .................. 62/271; 62/94
(58) Field of Search .................. 62/406, 412, 271, 62/275, 94, 171, 238.3, 238.6, 229, 228, 158, 160

(56) References Cited

U.S. PATENT DOCUMENTS

| | | | | |
|---|---|---|---|---|
| 3,619,987 A | * | 11/1971 | Colvin et al. | 96/111 |
| 4,377,400 A | * | 3/1983 | Okamoto et al. | 96/13 |
| 4,729,774 A | * | 3/1988 | Cohen et al. | 96/123 |
| 5,353,606 A | * | 10/1994 | Yoho et al. | 62/271 |
| 5,579,647 A | * | 12/1996 | Calton et al. | 62/94 |
| 5,816,065 A | * | 10/1998 | Maeda | 62/271 |
| 6,199,394 B1 | * | 3/2001 | Maeda | 62/271 |
| 6,557,365 B2 | * | 5/2003 | Dinnage et al. | 62/271 |
| 6,575,228 B1 | * | 6/2003 | Ragland et al. | 165/54 |
| 2004/0134211 A1 | * | 7/2004 | Lee et al. | 62/271 |

FOREIGN PATENT DOCUMENTS

KR    10-2002 0001137    1/2002

OTHER PUBLICATIONS

English Language Abstract of Korean 10–2002–0001137.

* cited by examiner

*Primary Examiner*—Chen Wen Jiang
(74) *Attorney, Agent, or Firm*—Greenblum & Bernstein, P.L.C.

(57) ABSTRACT

Disclosed is an air conditioning system including a duct having an intake passage through which outdoor air is induced and a discharge passage through which indoor air is discharged, suction and discharging fans respectively installed in the intake and discharge passages, a dehumidifier having a desiccant wheel rotatably mounted on an opening of the partition, a regenerating heater for heating air induced into the dehumidifier, a regenerating heat exchanger provided on the intake and discharge passages in the vicinity of an indoor side with reference to the dehumidifier to heat-exchange air flowing along the intake passage with air flowing along the discharge passage, and a heat pump provided on the duct to heat-exchange outdoor air that has passed through the regenerating heat exchanger and discharging the heat-exchanged air to an indoor space.

19 Claims, 4 Drawing Sheets

AIR CONDITIONING SYSTEM

This application claims the benefit of the Korean Application No. P2002-0083915 filed on Dec. 26, 2002, which is hereby incorporated by reference.

BACKGROUND OF THE INVENTION

1. Field of the Invention

The present invention relates to an air conditioning system, and more particularly, to an air conditioning system combining cooling, heating, ventilating, and dehumidifying functions.

2. Discussion of the Related Art

Generally, an air conditioner is an apparatus for providing a pleasant environment to an enclosed space such as a residential room, an office, and the like, by controlling the temperature and humidity of the space.

FIG. 1 shows a cooling/heating system of a conventional air conditioner.

As shown in the drawing, a cooling/heating system employed to a conventional air conditioner is configured to include a compressor 1, a four-way valve 2, an outdoor heat exchanger 3, an indoor heat exchanger 4, and an expansion apparatus 5. In the vicinity of the outdoor heat exchanger 3 and the indoor heat exchanger 4, an outdoor fan 3a and an indoor fan 4a are respectively installed. Such a cooling/heating system is selectively operated in a heating or cooling mode by varying an flow direction of refrigerant flowing in the outdoor and indoor heat exchangers 3 and 4 in response to a switching operation of the four-way valve 2 controlled by a control part.

The cooling mode operation of the cooling/heating system will be first described hereinafter.

Refrigerant compressed to a high pressure and high temperature by the compressor 1 is first directed to the outdoor heat exchanger 3, and is then condensed while being heat-exchanged with outdoor air. The condensed refrigerant is directed to and expanded to a low pressure and low temperature by the expansion apparatus 5. The expanded refrigerant is evaporated while being heat-exchanged with the indoor air and absorbing latent heat, and is then returned to the compressor 1. At this point, the indoor air is cooled while passing through the indoor heat exchanger 4 as the indoor fan 4a rotates, and is then directed to the indoor space, thereby lowering the temperature of the indoor space to a predetermined level.

The heating mode operation of the cooling/heating system will be described hereinafter.

Refrigerant compressed to a high pressure and high temperature by the compressor 1 is first directed to the indoor heat exchanger 4, and is then condensed while discharging the latent heat. The indoor air is heated while passing through the indoor heat exchanger 4 as the indoor fan 4a rotates, and is then directed to the indoor space, thereby increasing the temperature of the indoor space to a predetermined level. The refrigerant condensed in the indoor heat exchanger 4 is subsequently expanded while passing through the expansion apparatus 5, and the expanded refrigerant is evaporated in the outdoor heat exchanger 3 while absorbing heat from the outdoor air and is returned to the compressor 1.

As the above procedure is repeated with a cycle, the indoor space is cooled or heated to a predetermined temperature set by a user.

However, since the cooling/heating system is designed to cool and heat the indoor air and repeatedly circulate the cooled or heated air in the indoor space, the indoor air becomes polluted and the humidity of the air cannot be adjusted, causing the users to feel unpleasantness. Therefore, the user should open a window to change the polluted indoor air with outdoor air. Furthermore, since the indoor air that has been heated or cooled to a predetermined temperature is exhausted to the outside, the changed indoor air must be cooled or heated to the predetermined temperature, causing an increase in energy consumption.

SUMMARY OF THE INVENTION

Accordingly, the present invention is directed to an air conditioning system that substantially obviates one or more problems due to limitations and disadvantages of the related art.

An object of the present invention is to provide an air conditioning system combining cooling, heating, ventilating, and dehumidifying functions.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve the object and other advantages and in accordance with the purpose of the invention, as embodied and broadly described herein, there is provided an air conditioning system including a duct having an intake passage through which outdoor air is induced and a discharge passage through which indoor air is discharged, the intake and discharge passages being divided by a partition; suction and discharging fans respectively installed in the intake and discharge passages; a dehumidifier having a desiccant wheel rotatably mounted on an opening of the partition, the desiccant wheel being disposed crossing and exposed to the intake and discharge passages; a regenerating heater for heating air induced into the dehumidifier, the regenerating heater being provided adjacent to an air intake side of the dehumidifier in the discharge passage of the duct; a regenerating heat exchanger provided on the intake and discharge passages in the vicinity of an indoor side with reference to the dehumidifier to heat-exchange air flowing along the intake passage with air flowing along the discharge passage; and a heat pump provided on the duct to heat-exchange outdoor air that has passed through the regenerating heat exchanger and discharging the heat-exchanged air to an indoor space.

The desiccant wheel has an outer surface coated with a desiccant material to collect humidity contained in the air flowing along the intake passage and discharge the collected humidity to the air flowing along the discharge passage by being rotated to the discharge passage. The desiccant wheel has a first half exposed to the intake passage and a second half exposed to the discharge passage. The desiccant material is silica gel or titanium silicate.

The desiccant wheel includes a shaft supported on the opening; a plurality of blades extending from the shaft in a radial direction and each having a predetermined width; and a rim circumferentially enclosing outer ends of the blades.

Each of the blades is provided with a plurality of air-through holes. A section of the duct is circular-shaped corresponding to an outer circumference of the rim of the desiccant wheel. Each of the blades has a predetermined width in a direction where airs flowing along the intake and discharge passages are advanced. The regenerating heat exchanger is formed of aluminum.

The wherein portions of the intake and discharge passages are formed intersecting each other, and the regenerating heat exchanger is installed on the intersecting portion.

The regenerating heat exchanger is provided with a first passage communicating with the intake passage and a second passage communicating with the discharge passage and intersecting the first passage. The regenerating heat exchanger comprises a plurality of bent plates that are alternately piled up one another such that the first and second passages can be alternately formed in a multi-layer. Flat plates are disposed between the bent plates to define the first and second passages.

The heat pump includes a first heat exchanger provided in the intake passage in the vicinity of an air discharge side of the regenerating heat exchanger; and a compressor, a four-way valve, an expansion apparatus and a second heat exchanger that are connected to the first heat exchanger. In addition, the four-way valve includes a first operation position where an outlet opening of the compressor is connected to the second heat exchanger while the first heat exchanger is connected to an inlet opening of the compressor; and a second operation position where the outlet opening of the compressor is connected to the first heat exchanger while the second heat exchanger is connected to the inlet opening of the compressor.

In a cooling/dehumidifying/ventilating mode, the suction and discharging fans are operated, the desiccant wheel rotates, the regenerating heat is heated, and the four-way valve is switched to the first operation position.

In a heating/dehumidifying/ventilating mode, the suction and discharging fans are operated, the desiccant wheel rotates, the regenerating heater is heated, and the four-way valve is switched to the second operation position.

In a cooling/ventilating mode, the suction and discharging fans are operated, the desiccant wheel and the regenerating heater are not operated, and the four-way valve is switched to the first operation position.

In a heating/ventilating mode, the suction and discharging fans are operated, the desiccant wheel and the regenerating heater are not operated, and the four-way valve is switched to the second operation position.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiment of the present invention, examples of which are illustrated in the accompanying drawings. Wherever possible, the same reference numbers will be used throughout the drawings to refer to the same or like parts.

Figure 1:
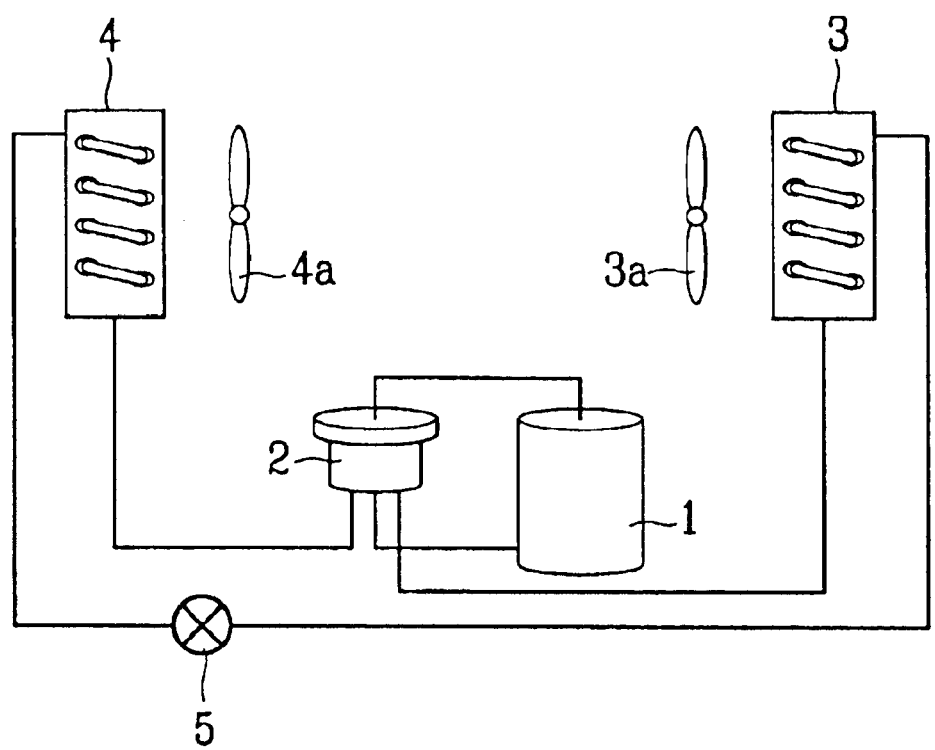
FIG. 1 illustrates a schematic diagram of a conventional air conditioner.
Figure 2:
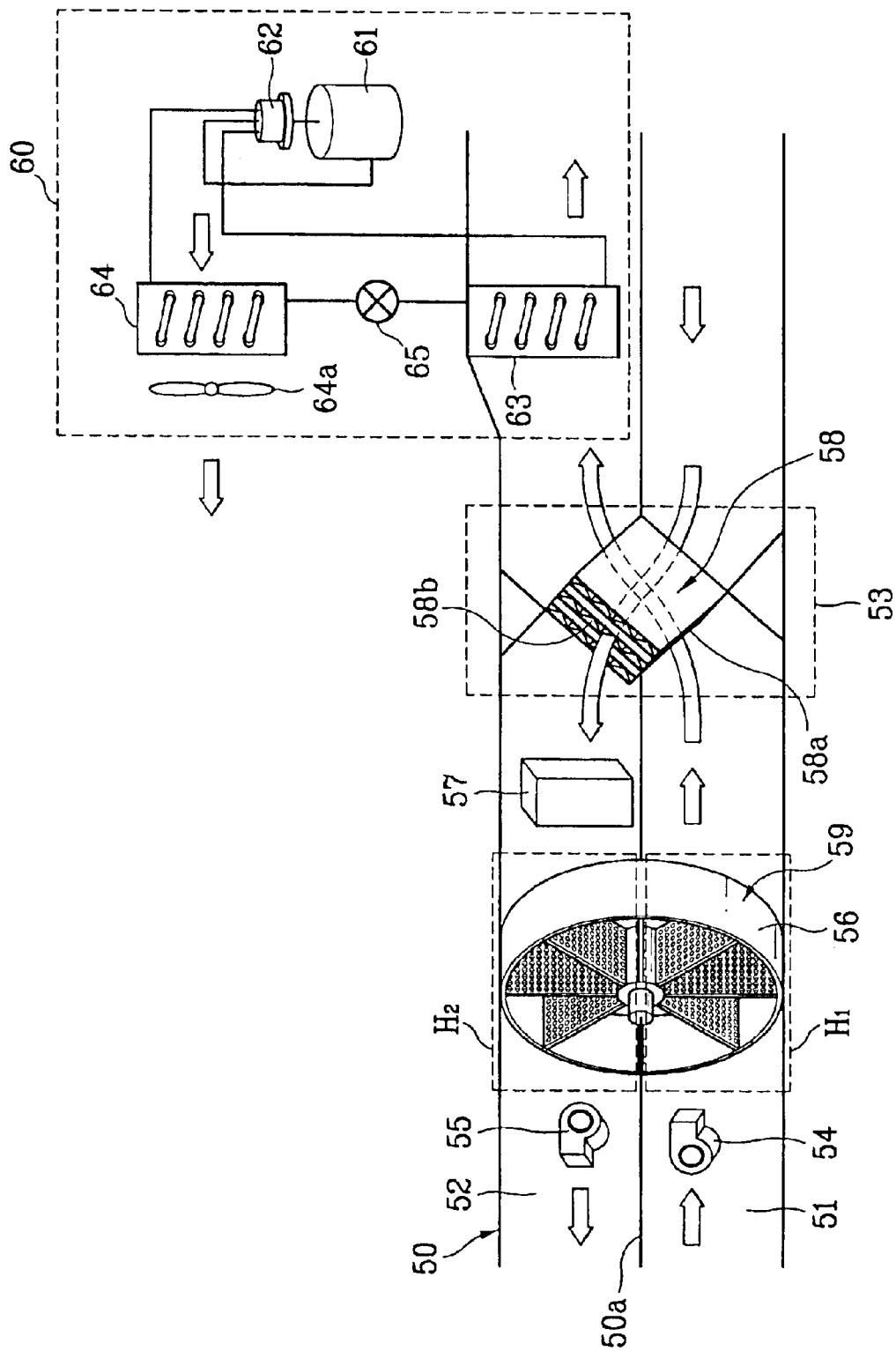
FIG. 2 illustrates a schematic diagram of an air conditioning system according to a preferred embodiment of the present invention.
Figure 3:
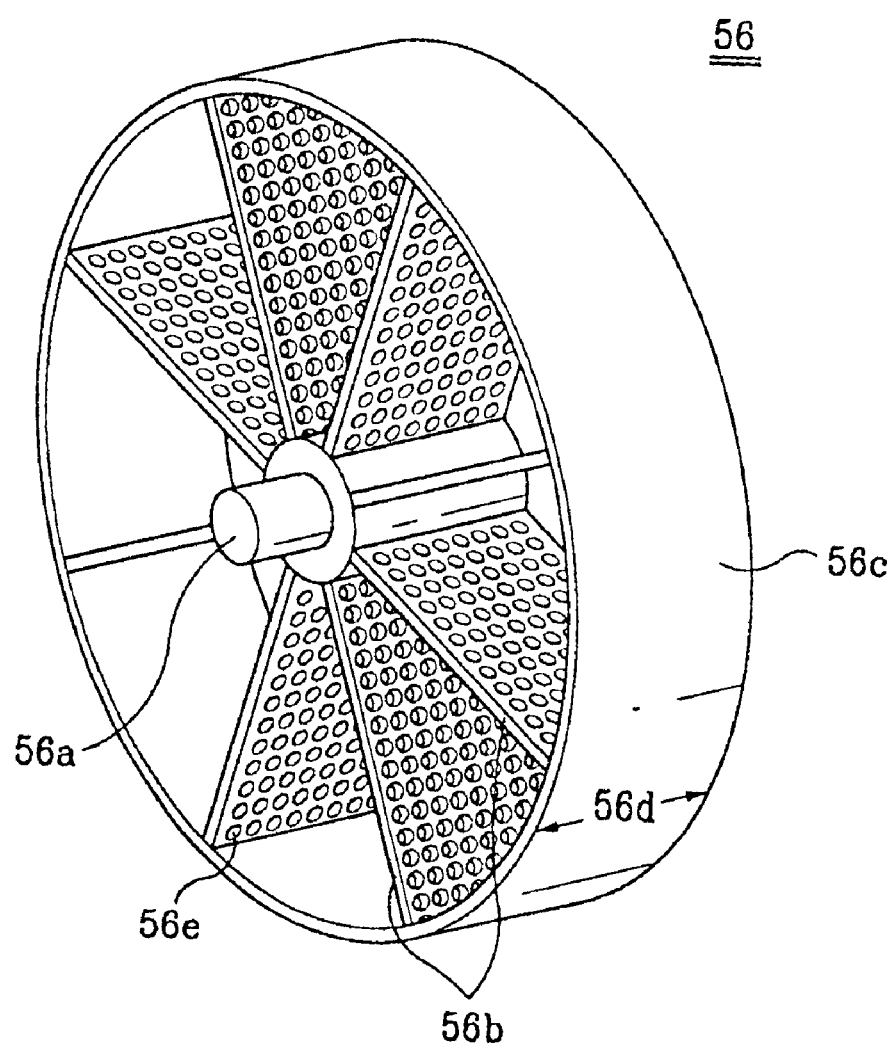
FIG. 3 illustrates an perspective view of a desiccant wheel of a dehumidifier apparatus depicted in FIG. 2.

FIG. 2 shows an air conditioning system according to a preferred embodiment of the present invention, and FIG. 3 is a dehumidifying apparatus depicted in FIG. 2.

Referring first to FIG. 2, the inventive air conditioning system comprises a duct 50, a suction fan 54, a discharging fan 55, a dehumidifier apparatus 59, a regenerating heater 57, a regenerating heat exchanger 58, and a heat pump 60.

The duct 50 is provided with an air intake passage and an air discharge passage 52 that are separated from each other by a partition 50a. The suction fan 54 for suctioning outdoor air is installed in the air intake passage 51, and the discharge fan 55 for discharging indoor air is disposed in the discharge passage 52.

Meanwhile, the partition 50a for separating the intake passage 51 from the discharging passage 52 is provided with an opening in which the dehumidifier 59 is provided. The dehumidifier 59 comprises a rotating desiccant wheel 56 whose outer surface is coated with a desiccant material. The dehumidifier 59 collects humidity contained in the air suctioned through the air intake passage 51 and rotates to communicate with the discharge passage 52, thereby discharging the collected humidity to the air being discharged.

The desiccant material has properties such that it collects the humidity contained in the air at a temperature less than a predetermined level, and discharges the collected humidity at a temperature higher than the predetermined level. The desiccant material is preferably formed of silica gel or titanium silicate.

Referring again to FIG. 2, a first half H1 of the desiccant wheel 56 of the dehumidifier 59 is exposed to the air intake passage 51, and a second half H2 thereof is exposed to the discharge passage 51. However, the present invention is not limited to this. The design of the duct 50 can be varied such that appropriate amounts of the desiccant wheel 56 can be exposed to the intake and discharge passages 51 and 52.

One embodiment of the dehumidifier 59 having the desiccant wheel 56 will be described in more detail hereinafter.

As shown in FIG. 3, the desiccant wheel 56 comprises a shaft 56a, blades 56b, and a rim 56c.

The shaft 56a is rotatably fixed at both its ends on an opening of the partition 50a. The blades 56b are disposed on an outer circumference of the shaft 56a in a radial direction, defining air passages therebetween. The rim 56c is provided enclosing outer ends of the blades 56b. The desiccant wheel 56 is rotated by a power transmission system such as a motor connected to the shaft 56a.

In order to prevent the rotation of the desiccant wheel 56 from disturbing the airflow along the discharge and intake passages 52 and 51, the blades 56b are provided with a plurality of air-through holes 56e. A portion of the desiccant wheel 56 where the largest amount of air passing through the intake and discharge passages 51 and 52 contacts is the blades 56b. Therefore, when the desiccant wheel 56 rotates, the blades 56b disturb the airflow. However, in this embodiment, since the blades 56b are provided with a plurality of air-through holes 56e, the disturbance to the airflow by the blades 56b can be remarkably reduced. In addition, since the air-through holes 56e allow an effective increase of the area where the air contacts blades 56b, a more uniform air contact can be realized. It is also more preferable that the rim 56c is provided with a plurality of air-through holes so that the rim 56c can more effectively contact the air containing the humidity.

Meanwhile, in order to allow the desiccant wheel 56 to more effectively contact the flowing air, it is preferable that a section of the duct 50 is designed in a circular shape corresponding to the shape of an outer circumference of the rim 56c. As a result, most of the air contacts the desiccant material coated on the blades 56b while passing through the rim 56c.

Furthermore, to ensure the appropriate dehumidifying function, the blades 56b are designed having a predetermined width 56d in a direction where the air flows through the discharge and intake passages 52 and 51. The predetermined width 56d is determined considering an outdoor environment and humidity of a place where the air conditioning system is installed. For example, when the air conditioning system is installed in a place where the humidity is high, the width 56d of the blades 56d is preferably lengthened to improve the dehumidifying efficiency by enlarging the air contact area of the blades 56b.

The dehumidifying operation of the dehumidifier 59 having the desiccant wheel 56 will be described in more detail hereinafter.

The desiccant wheel 56 collects humidity contained in outdoor air using the first half H1 exposed to the intake passage 51. The first half H1 rotates to the discharge passage 52 as the desiccant wheel 56 rotates. As the outdoor air heated by the regenerating heater 57 passes through the first half H, the humidity collected in the first half H1 is transferred into the heated indoor air and is then discharged to the outdoor space together with the indoor air. Accordingly, the humidity contained in air introduced into the indoor space can be eliminated to a predetermined extent.

As described above, the desiccant material has a property such that it collects humidity at a temperature less than a predetermined level and emits the same at a temperature higher than the predetermined level. Accordingly, to emit the humidity collected in the desiccant material, the regenerating heater 57 is installed in the vicinity of the dehumidifier 56 of the discharge passage 52. The regenerating heater 57 is preferably installed in an air intake side of the dehumidifier 59 to heat the air introduced into the dehumidifier 56, and the heated air emits the humidity in the desiccant material by a steam pressure difference while passing through the dehumidifier 59. That is, by reducing the relative humidity by heating the air induced into the dehumidifier 59, the humidity in the desiccant is emitted to the induced air. Here, the regenerating heater 57 may be formed of a solar heat collecting system or a waste heat utilizing system.

The regenerating heat exchanger 58 is provided in the intake and discharge passages 51 and 52 proximal to the indoor side based on the dehumidifier 59 so that air passing through the intake and discharge passages 51 and 52 can be heat-exchanged with each other.

As shown in FIG. 2, the duct 50 is formed such that portions of the intake and discharge passages 51 and 52 intersect each other at an intersection portion 53 where the regenerating heat exchanger 58 is disposed. The regenerating heat exchanger 58 has a first passage 58a communicating with the intake passage 51 and a second passage communicating with the discharge passage 52. The first and second passages 58a and 58b are formed independently from each other while intersecting each other. As the outdoor air of the intake passage 51 is heat-exchanged with the indoor air of the discharge passage 52 while they intersect each other at the first and second passages 58a and 58b, a thermal conduction area can be increased.

Figure 4:
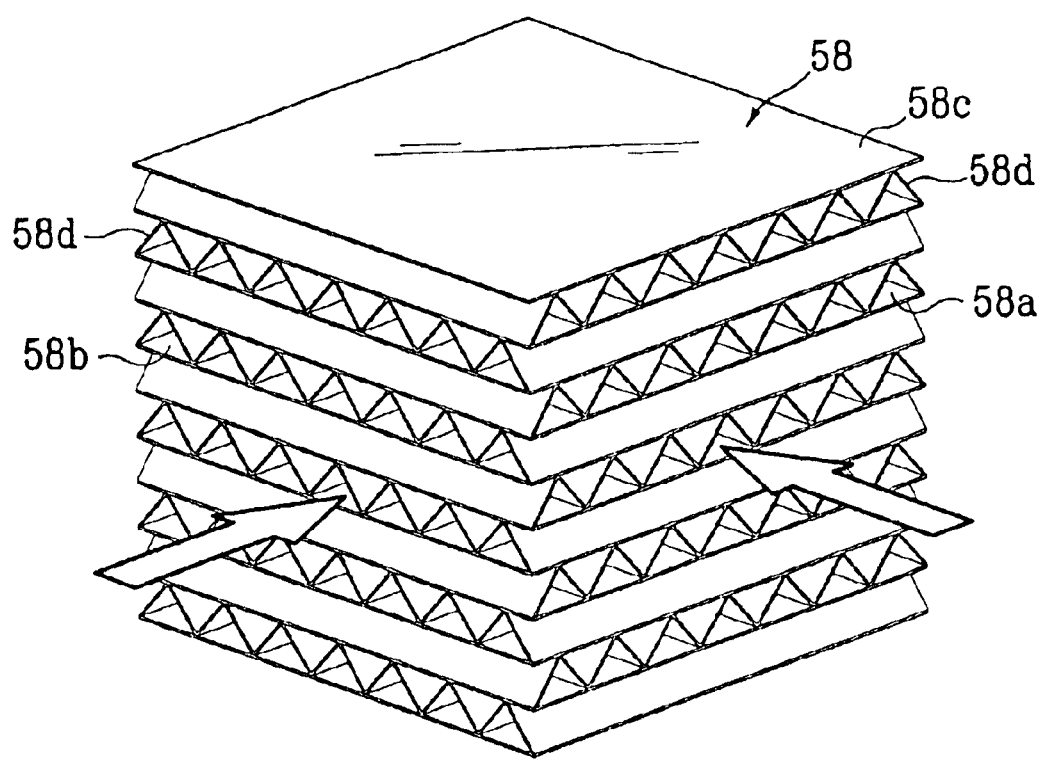
FIG. 4 illustrates a detailed view of a regenerating heat exchanger depicted in FIG. 2.

As shown in FIG. 4, the regenerating heat exchanger 58 comprises a plurality of bent plates 58d that are alternately stacked in a perpendicular direction such that the first and second passages 58a and 58b can be alternately formed in a multi-layer configuration.

To define the first and second passages 58a and 58b between the bent plates 58c, the regenerating heat exchanger 58 further comprises flat plates 58c disposed on the respective tops of the bent plates 58d. Preferably, the flat plates 58c are attached on the bent plates 58d by welding, for example, to enhance the heat exchange. More preferably, the bent and flat plates 58c and 58d are formed of a material such as aluminum having high thermal conductivity. The regenerating heat exchanger 58 of the present invention is not limited to the above structure, but can be modified in its design.

Referring again to FIG. 2, disposed on the duct 59 is a heat pump 60 for discharging the heat-exchanged outdoor air that has passed through the regenerating heat exchanger 58 to the indoor space. The heat pump 60 comprises a compressor 61, a four-way valve 62, first and second heat exchangers 63 and 64, and an expansion apparatus 65. The first heat exchanger 63 is provided proximal to the air discharging side of the regenerating heat exchanger 58 in the intake passage 51. It is preferable that the compressor 61, the four-way valve 62, the expansion apparatus 65, and the second heat exchanger 64 are disposed on the outside of the duct 50. When the second heat exchanger 64 is disposed on the outside of the duct 50, a fan 64a is disposed in the vicinity of the second heat exchanger 64.

In a cooling cycle, the heat exchanger connected to the discharging side of the compressor 61 functions as a condenser to discharge heat to the outside. The heat exchanger connected to the intake side of the compressor 61 functions as an evaporator to absorb heat of the outside. Accordingly, by appropriately switching the flowing direction of the refrigerant using the four-way valve, the function of the first heat exchanger 63 can be selectively converted.

The four-way valve 62 has two inlets and two outlets selectively communicating with the respective inlets to define two passages. The communication of the inlets and the outlets are selectively exchanged in response to a switching signal. Therefore, the flowing direction of the refrigerant in the first and second heat exchangers 63 and 64 is varied in accordance with the switching operation of the four-way valve 62, thereby selectively performing the cooling and heating mode operations.

The four-way valve 62 connects an outlet opening of the compressor 61 to the second heat exchanger 64, and at the same time, connects the first heat exchanger 63 to an inlet opening of the compressor 61, thereby realizing a first operation position. In addition, the four-way valve 62 connects the outlet opening of the compressor 61 to the first heat exchanger 63, and at the same time, connects the second heat exchanger 64 to an inlet opening of the compressor 61, thereby realizing a second operation position. In the first operation position, the first heat exchanger 63 functions as an evaporator to perform the cooling operation, and in the second operation position, the same functions as a condenser to realize the heating operation. The four-way valve 62 is designed to selectively switch the first and second operation with each other. Accordingly, the first heat exchanger 63 heat-exchanges the outdoor air heat-exchanged in the regenerating heat exchanger 58 and then discharges the same to the indoor space, thereby cooling or heating the indoor space to a predetermined temperature.

Describing the above-described system in general, the outdoor air introduced into the dehumidifier 59 is increased in temperature while being dehumidified and condensed by the desiccant material, and is then firstly heat-exchanged while passing through the regenerating heat exchanger 58. The heat-exchanged air is secondly heat-exchanged while passing through the first heat exchanger 63. At this point, a predetermined amount of heat energy of the air discharged to the outside through the regenerating heat exchanger 58 is recovered.

The operation of each constitutional part in a variety of operation modes of the above-described air conditioning system will be described in more detail hereinafter.

The air conditioning system is designed to operate in a variety of operation modes including a ventilating mode, a dehumidifying mode, a cooling mode, and a heating mode in response to the control of the suction and discharging fans 51 and 52, the dehumidifier 59, the regenerating heater 57, and the heat pump 60.

The ventilating/dehumidifying/cooling mode operation of the air conditioning system will be first described hereinafter.

When the suction and discharging fans 54 and 55 are operated, the outdoor air is induced into the intake passage 51 and is then dehumidified by the desiccant material while passing through the dehumidifier 59. At this point, the outdoor air is heated somewhat by being dehumidified and condensed by the desiccant material.

At this point, the heat pump 60 is switched to the first operation position by the four-way valve 62, whereby the refrigerant consecutively circulates through the compressor 61, the four-way valve 62, the second heat exchanger 64, the expansion apparatus 65, and the first heat exchanger 63. Accordingly, the first heat exchanger 63 functions as an evaporator, and the second heat exchanger 64 functions as a condenser. Afterward, the outdoor air is finally cooled and discharged to the indoor space through the first heat exchanger 63 after passing through the first passage 58a of the regenerating heat exchanger 58, thereby cooling the indoor space by the dry and cool air.

The indoor air circulates in the indoor space, and is then induced into the discharge passage 52 by the suction force of the suction fan 55. The air induced into the discharge passage 52 cools the outdoor air passing through the second and first passages 58b and 58a of the regenerating heat exchanger. As a result, the regenerating heat exchanger 58 functions as a device for saving energy for cooling the indoor air. At this point, the humidity contained the air induced into the indoor space is removed as the desiccant wheel 56 of the dehumidifier 59 rotates.

As described above, in the ventilating/dehumidifying/cooling mode, the air conditioning system ventilates the indoor air while supplying dry and cool air to the indoor space when it is hot and damp.

Meanwhile, when a user does not want the dry air, the dehumidifier 59 is turned off. When the dehumidifier 59 is turned off, the regenerating heater 57 is not operated.

The ventilating/heating mode operation of the air conditioning system will be described hereinafter.

In the ventilating/heating mode, the heat pump 60 circulates the refrigerant in accordance with the switching operation of the four-way valve in a direction opposite to that of refrigerant circulating in the ventilation and cooling operation modes. Accordingly, the first heat exchanger 63 functions as a condenser, and the second heat exchanger 64 functions as an evaporator.

Likewise, when the user does not want the dry air, the dehumidifier 59 is turned off, not operating the regenerating heater 57.

Next, the ventilating mode operation will be described hereinafter.

When the suction fan 54 is operated, the outdoor air consecutively flows along the dehumidifier 59, the regenerating heat exchanger 58, and the first heat exchanger 63. At the same time, by operating the discharge fan 55, the indoor air flows consecutively along the regenerating heat exchanger 58 and the dehumidifier 59. Here, the dehumidifier 56, the regenerating heater 58 and the heat pump 60 are not operated.

The outdoor air is heat-exchanged while passing through the first and second passages 58a and 58b of the regenerating heat exchanger 58, whereby a predetermined amount of the heat energy of the indoor air being discharged to the outside is recovered. Accordingly, the temperature variation of the indoor space by the ventilating mode operation can be reduced when compared with ventilation by opening a window. The ventilating mode operation can be intermittently performed in the ventilating/cooling (or heating) mode operation, or can be independently performed from other mode operations.

As described above, the air conditioning system of the present invention has advantages as follows:

First, in the ventilating/cooling (or heating) mode, since the cooling or heating operation is performed while ventilating the indoor space, the indoor air can be freshly maintained even when the air conditioning system is operated for a long time.

Second, since the air conditioning system has a dehumidifying function, dry and cool (or hot) air can be supplied to the indoor space even in damp weather.

Third, in the ventilating mode, since the indoor air is discharged to the outside after some of the heat energy thereof is recovered by the regenerating heat exchanger, the electric power consumption for newly cooling or heating the indoor space can be remarkably reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An air conditioning system comprising:
   a duct having an intake passage through which outdoor air is induced and a discharge passage through which indoor air is discharged, the intake and discharge passages being divided by a partition;
   suction and discharging fans respectively installed in the intake and discharge passages;
   a dehumidifier having a desiccant wheel rotatably mounted on an opening of the partition, the desiccant wheel being disposed crossing and exposed to the intake and discharge passages;
   a regenerating heater for heating air induced into the dehumidifier, the regenerating heater being provided adjacent to an air intake side of the dehumidifier in the discharge passage of the duct;

a regenerating heat exchanger provided on the intake and discharge passages in the vicinity of an indoor side with reference to the dehumidifier to heat-exchange air flowing along the intake passage with air flowing along the discharge passage; and a heat pump provided on the duct to heat-exchange outdoor air that has passed through the regenerating heat exchanger and discharging the heat-exchanged air to an indoor space;

the desiccant wheel comprising:

a shaft supported on an edge of the opening; and a plurality of blades extending from the shaft in a radial direction and each having a predetermined width, the blades provided with a plurality of air through holes.

2. The air conditioning system of claim 1, wherein the desiccant wheel has an outer surface coated with a desiccant material to collect humidity contained in the air flowing along the intake passage and discharge the collected humidity to the air flowing along the discharge passage by being rotated to the discharge passage.

3. The air conditioning system of claim 2, wherein the desiccant wheel has a first half exposed to the intake passage and a second half exposed to the discharge passage.

4. The air conditioning system of claim 2, wherein the desiccant material is silica gel.

5. The air conditioning system of claim 2, wherein the desiccant material is titanium silicate.

6. The air conditioning system of claim 1, the desiccant wheel further comprising a rim circumferentially enclosing outer ends of the blades.

7. The air conditioning system of claim 6, wherein a section of the duct is circular-shaped corresponding to an outer circumference of the rim of the desiccant wheel.

8. The air conditioning system of claim 6, wherein each of the blades has a predetermined width in a direction where airs flowing along the intake and discharge passages are advanced.

9. The air conditioning system of claim 1, wherein the regenerating heat exchanger is formed of aluminum.

10. The air conditioning system of claim 1, wherein the wherein portions of the intake and discharge passages are formed intersecting each other, and the regenerating heat exchanger is installed on the intersecting portion.

11. The air conditioning system of claim 10, wherein the regenerating heat exchanger is provided with a first passage communicating with the intake passage and a second passage communicating with the discharge passage and intersecting the first passage.

12. The air conditioning system of claim 11, wherein the regenerating heat exchanger comprises a plurality of bent plates that are alternately piled up one another such that the first and second passages can be alternately formed in a multi-layer.

13. The air conditioning system of claim 12, wherein flat plates are disposed between the bent plates to define the first and second passages.

14. The air conditioning system of claim 1, wherein the heat pump comprises:

a first heat exchanger provided in the intake passage in the vicinity of an air discharge side of the regenerating heat exchanger; and a compressor, a four-way valve, an expansion apparatus and a second heat exchanger that are connected to the first heat exchanger.

15. The air conditioning system of claim 1, wherein the four-way valve comprises:

a first operation position where an outlet opening of the compressor is connected to the second heat exchanger while the first heat exchanger is connected to an inlet opening of the compressor; and a second operation position where the outlet opening of the compressor is connected to the first heat exchanger white the second heat exchanger is connected to the inlet opening of the compressor.

16. The air conditioning system of claim 15, wherein in a cooling/dehumidifying/ventilating mode, the suction and discharging fans are operated, the desiccant wheel rotates, the regenerating heat is heated, and the four-way valve is switched to the first operation position.

17. The air conditioning system of claim 15, wherein in a heating/dehumidifying/ventilating mode, the suction and discharging fans are operated, the desiccant wheel rotates, the regenerating heater is heated, and the four-way valve is switched to the second operation position.

18. The air conditioning system of claim 15, wherein in a cooling/ventilating mode, the suction and discharging fans are operated, the desiccant wheel and the regenerating heater are not operated, and the four-way valve is switched to the first operation position.

19. The air conditioning system of claim 15, wherein in a heating/ventilating mode, the suction and discharging fans are operated, the desiccant wheel and the regenerating heater are not operated, and the four-way valve is switched to the second operation position.

* * * * *

UNITED STATES PATENT AND TRADEMARK OFFICE
CERTIFICATE OF CORRECTION

PATENT NO.      : 6,918,263 B2
DATED           : July 19, 2005
INVENTOR(S)     : W. H. Lee et al.

It is certified that error appears in the above-identified patent and that said Letters Patent is hereby corrected as shown below:

Column 10,
Line 26, "white" should be -- while --.

Signed and Sealed this

Twenty-eighth Day of March, 2006

JON W. DUDAS
*Director of the United States Patent and Trademark Office*